G. W. BOLLINGER.
BAKING APPARATUS.
APPLICATION FILED FEB. 1, 1919.

1,346,076.

Patented July 6, 1920.

Inventor
George W. Bollinger
By C. C. Shepherd
Attorney

UNITED STATES PATENT OFFICE.

GEORGE W. BOLLINGER, OF COLUMBUS, OHIO.

BAKING APPARATUS.

1,346,076.  Specification of Letters Patent.  Patented July 6, 1920.

Application filed February 1, 1919. Serial No. 274,493.

*To all whom it may concern:*

Be it known that I, GEORGE W. BOLLINGER, a citizen of the United States, residing at Columbus, in the county of Franklin and State of Ohio, have invented certain new and useful Improvements in Baking Apparatus, of which the following is a specification.

This invention relates to baking apparatus and is designed particularly for use by bakers in production of uniform sizes and shapes of loaves. To this end, I have provided an apparatus comprising a plurality of baking pans suitably held together and designed to coöperate with a cover member, this latter being provided with a plurality of cavities corresponding to the number of pans. In order to prevent the dough from over-running the sides of the pans and from coming in contact with the dough in adjacent pans, I have provided this cover with a plurality of division blades designed to be located between the assembled pan structures. By this arrangement, a uniform size and shape of loaf may be obtained and the crust not be broken or scarred by being baked in contact with an adjacent loaf. Likewise, because of the cover arrangement, a crust of less thickness and hardness may be obtained than is the case where the dough is exposed to direct contact with the heat.

Figure 1:
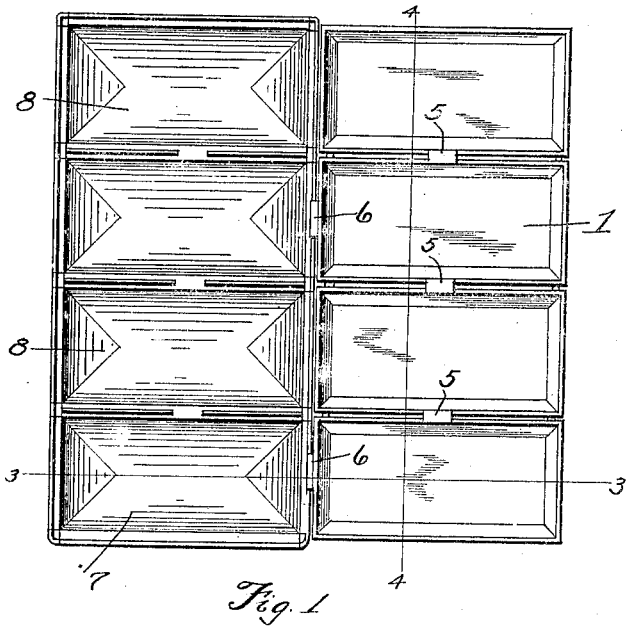
Figure 2:
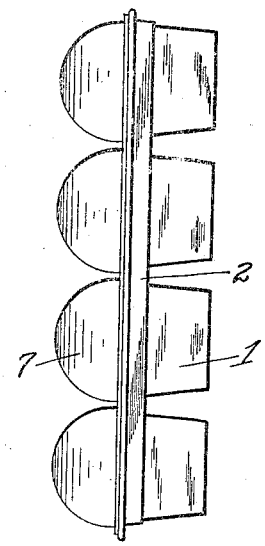
Figure 3:
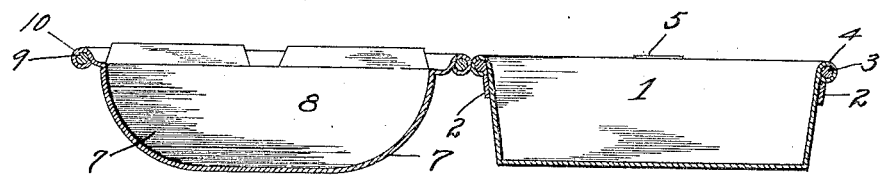
Figure 4:
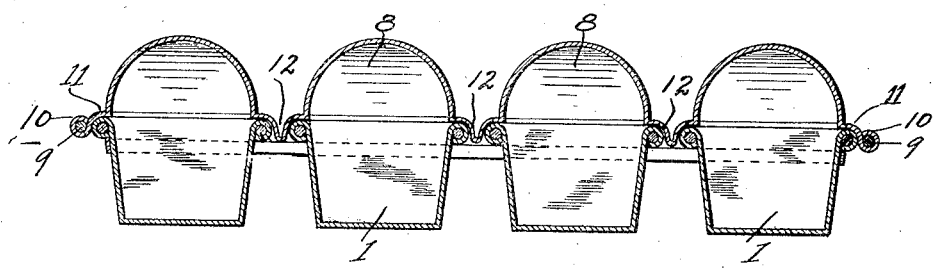

The preferred embodiment of my invention is shown in the accompanying sheets of drawings wherein similar characters of reference designate corresponding parts and wherein, Figure 1 is a top plan view of my improved type of baking pan showing the top in its open position, Fig. 2 is a side view of the structure shown in Fig. 1 but showing the top in its closed position, Fig. 3 is a cross-section of the structure shown in Fig. 1 and taken on line 3—3 thereof, and Fig. 4 is a longitudinal section of the assembled pans when in closed position corresponding to line 4—4 of Fig. 1.

In these drawings, there are shown a plurality of pans 1 all of uniform size and shape and held in their assembled relation by means of the endless band member 2 which passes about them and is secured to them in any desired manner as for instance by spot welding. The upper edges of each of these pans is turned over a wire or rod 3 as is indicated at 4 to form a rounded or beaded edge. In addition to the bands 2, the bands are held spaced from each other by means of the spacing plates 5 which also may be secured to the bands in any preferred manner, it being intended that they shall hold the bands in their proper relation with the assistance of the band 2. The rear edge wire 3 may also serve the purpose of forming a portion of a hinge structure 6 by means of which the cover member 7 is hingedly mounted in connection with the pan structure. This cover member comprising a corresponding number of dome pieces 8 all of uniform size and shape. The outside edges of these dome sections are also curled about a wire 9 as is shown at 10 and are additionally provided with a slight bend such as is shown at 11 so that the cover and pan portion may come into firm holding or sealing relation with each other along their outer edges. Intermediate the various domes, there is formed a depending division blade structure 12 which is of a size and shape to seal the edges of the pans and to enter the space between the various pans to insure the prevention of the dough of one pan from coming in contact with that of another. Should the baker become careless in filling the various pans so that a portion of the dough may be disposed between the pan, it is severed and properly shaped.

From the foregoing description, taken in connection with the accompanying sheet of drawings, it will be apparent that I have provided a structure which will produce loaves of uniform size and shape and at the same time prevent the sides of the loaf from being scarred by the overflowing of the dough or by contact of one loaf with the other. By means of the cover, a crust is formed which is not hard and is not as thick as that produced when the heat of the oven is in actual contact with the dough.

What I claim is:

A baking apparatus comprising a plurality of separate pan members rigidly held together in spaced relationship, a hinged cover for said pan members provided with a number of cavities of semi-circular cross sectional formation, said cavities being disposed when said cover occupies its closed position to register with said pan members, divisional ribs integrally formed with said cover and situated between the cavities thereof, said ribs being adapted to enter between said pan members so as to maintain the relatively separated state of the latter, rolled edges formed upon said pan members to provide a seat for said cover, and flanges formed upon the marginal edges of said cover and arranged to overlap and seat upon the rolled edges of said pan members.

In testimony whereof I affix my signature.

GEORGE W. BOLLINGER.